Dec. 1, 1931.  E. A. SAUNDERS  1,834,225
QUICK OPERATING FASTENER
Filed June 15, 1925
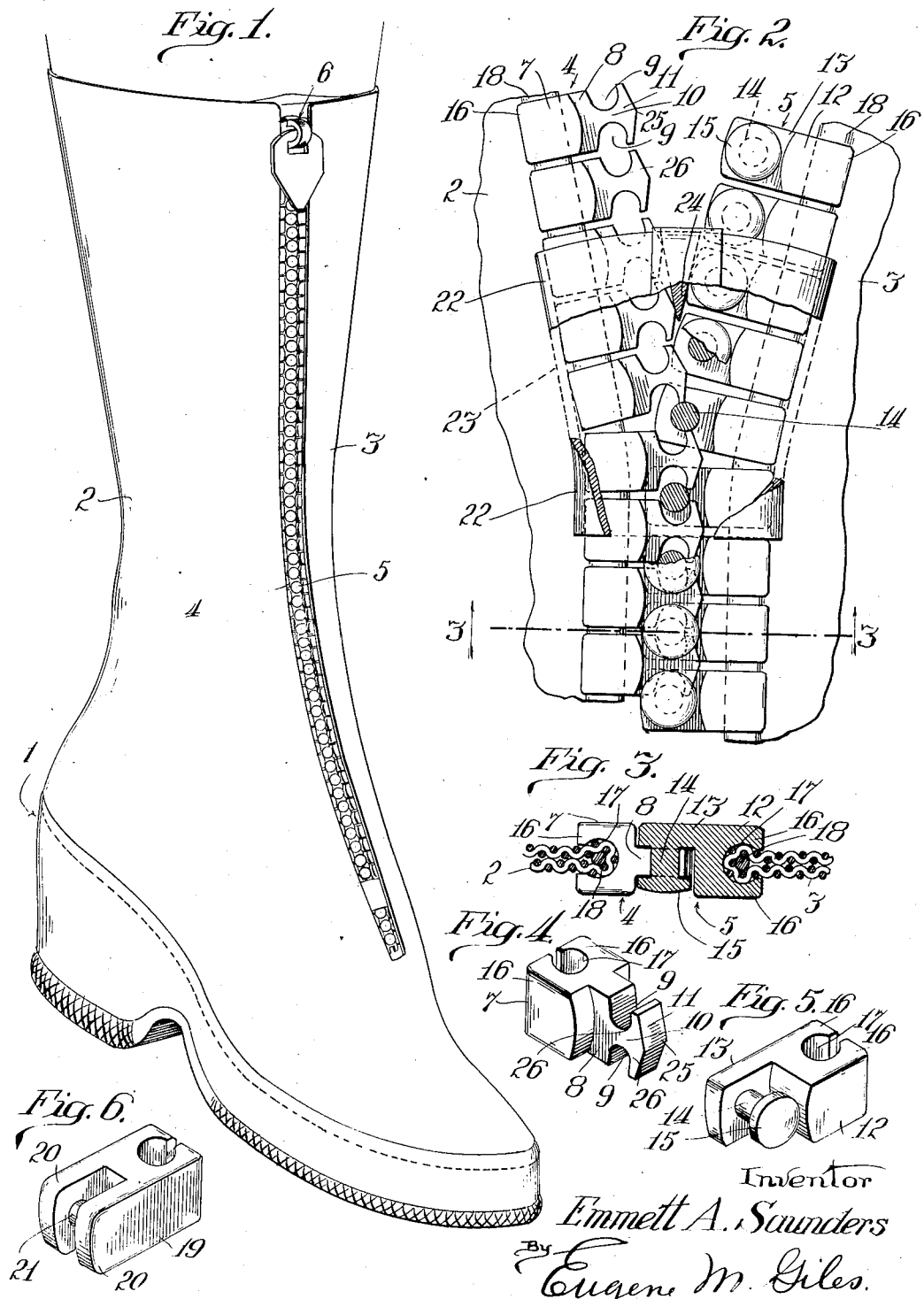
Inventor
Emmett A. Saunders
By Eugene M. Giles.
Attorney Patented Dec. 1, 1931

1,834,225

UNITED STATES PATENT OFFICE

EMMETT A. SAUNDERS, OF SOUTH BEND, INDIANA, ASSIGNOR TO MISHAWAKA RUBBER AND WOOLEN MANUFACTURING COMPANY, OF MISHAWAKA, INDIANA, A CORPORATION OF INDIANA

QUICK OPERATING FASTENER

Application filed June 15, 1925. Serial No. 37,026.

My invention relates to fasteners of the type wherein opposed series of fastener elements are arranged respectively on the parts which are to be connected and are adapted to be interlocked and released by movement of a cam member or slider therealong.

It has become a common practice to use fasteners of the above character in connection with various articles as, for example, shoes and other footwear. When used in connection with footwear, the fastener must be quite flexible and at the same time securely interlocked so that it will readily respond to bending movements of the foot without undue strain on the fastener or disengagement or displacement of any of the fastener elements. Moreover the fastener must be of a durable and substantial character so that it will withstand constant hard usage without getting out of order.

The principal objects of my invention are to provide an improved fastener which is strong and durable; to construct the fastener elements so that they interlock and release freely; to securely interlock the fastener elements; to afford the required flexibility without danger of release or displacement of the fastener elements; to construct the fastener in such a manner that excessive lateral bending may be controlled; and in general to provide an improved quick operating fastener which is of simple form, may be conveniently manufactured and which affords a neat attractive appearance.

On the drawings, Fig. 1 is a perspective view of an overshoe having a fastener thereon constructed in accordance with my invention.

Fig. 2 is an enlarged front view of a fragmentary portion of the fastener with the operating member broken away to show the manner in which the fastener elements engage and disengage.

Fig. 3 is a transverse sectional view on the line 3—3 of Fig. 2; and

Figs. 4 and 5 are perspective views, respectively, of the individual elements composing my fastener; and Fig. 6 is a similar view of a modified form of fastener element.

I have shown and described my fastener herein as applied to an arctic or overshoe of the type commonly worn by women, but it is to be understood that this is merely for the purpose of illustration and that I contemplate using the fastener on other types of footwear and also in connection with various other articles wherein it may be desirable to use a fastener of this type.

Referring to the drawings, the reference numeral 1 indicates an overshoe as a whole which is divided down the front to afford separable side portions 2 and 3, along the forward edges of which are secured, respectively, series of fastener elements 4 and 5 which are adapted to be interlocked and released by movement of a cam member or slider 6 therealong.

Each of the fastener elements 4 consists of a small block 7, preferably of metal, which is provided at one end with a flat tongue 8, having a corresponding seat or notch 9 in each edge forming substantially a double hook with a neck 10 and a head 11. Each of the elements 5, consists of a similar block 12, likewise preferably of metal and having a wing extension portion 13 at one side forming a corner seat in which is located a stem 14 which projects laterally from the inner face of the wing 13 as shown in Figs. 3 and 5 and terminates at the other side of the element in a button shaped head or disk 15. The side portion or wing extension 13 and the other side portion or head 15 between which the stem 14 is interposed afford laterally spaced enlargements at the respective ends of said stem, providing abutments to confine the interlocking portion of the opposed elements 4 therebetween and prevent lateral displacement of said interlocking portion from the stem 14. The elements 5 are secured to the forward edge of the portion 3 of the shoe in closely spaced relation, substantially as shown in Fig. 2, and the elements 4 are similarly secured to the forward edge of the side portion 2 of the overshoe, but staggered with respect to the elements 5, so that the stems 14 nest in the seats 9 between the neck portions 10 of adjoining elements 4 and said neck portions 10 nest between the stems 14 of adjoining elements 5. With the construction above described, the series of elements 4 have the heads 11 at the ends of the elements and connected with the bodies of the elements by neck portions 10 which extend lengthwise of the elements, while the heads 15 are at the sides of the elements 5 and connected with the bodies of the elements 5 by transversely extending stems 14 and the stems 14 and necks 10 cross substantially at right angles in the interlocking position.

The elements 4 and 5 may be secured to the side portions 2 and 3 of the shoe, in any convenient manner as, for example, by forming the rear of the blocks 7 and 12 with opposed jaws 16 and a widened throat 17 so as to clamp around the enlarged edge 18 of the side portions 2 and 3. The enlarged edge 18 is usually provided by securing a cord in or to the edge portions of the parts to be connected, and may be formed directly on such parts. In practice, however, it is customary to employ a tape with an enlarged corded edge to which the elements 4 and 5 are attached and these tapes with the elements attached thereto are then secured to the parts which are to be connected.

The fastener elements with which the elements 4 co-operate may be constructed otherwise than as shown in Figs. 2, 3 and 5, for example as shown in Fig. 6 wherein the block 19 is formed with a pair of spaced side portions in the form of wings 20 which are spaced apart a sufficient distance to admit the tongue 8 of the fastener element 4 therebetween and a pin or stem 21 extends between and has the ends secured to the side wings 20, which latter afford abutments to confine the interlocking portions of the elements 4 therebetween on the stems 21.

The cam member or slider 6 is of substantially the usual form comprising front and rear plates 22 and 23 respectively which are flared at their upper ends and secured together with a wedge shaped member 24 therebetween. The lateral edges of these plates 22 and 23 are turned inwardly so as to embrace the rear ends of the blocks 7 and 12 (or 19) and form, substantially, divergent channels which merge into a single channel at the lower end of the slider and serve upon movement of the slider in one direction to spread apart and release the elements 4 and 5 from engagement with one another and upon movement in the other direction to bring the elements 4 and 5 together and interlock same. It will be observed that as the slider 6 moves along the opposed series of elements 4 and 5 a bend occurs in each series of fastener elements whereby the inner extremities of the adjoining elements of each series are spread apart sufficiently so that the inner ends of the elements of one series may be inserted between or withdrawn from between adjoining elements of the other series. When the elements have been interengaged in this manner the outer ends of adjoining elements resume the normal position with the pins 14 engaged in opposed notches 9 of adjacent elements 4, and the neck portions 10 of the elements 4 engage between pins or stems 14 of the adjoining elements 5 so that the series of elements 4 are securely interlocked with the series of elements 5.

The inner extremities of the tongues 8 of the elements 4 are preferably formed with somewhat bluntly pointed ends 25 having oppositely inclined end faces which serve to center the elements 4 between the pins 14 of adjoining elements 5, and said pins 14 are rounded so as to co-operate with the oppositely inclined faces of the pointed ends 25 and facilitate the proper positioning of the stems 14 between adjoining members 4. The notches 9 are preferably made quite deep to afford adequate room for the pins 14 and to permit freedom of movement or flexibility and these notches are also preferably undercut as indicated at 26 to increase the holding effect on the pins 14.

By regulating the distance between the inner face of the head 15 and the opposed face of the wing 13 (or the distance between the wings 20 in the structure of Fig. 6) relatively to the thickness of the tongues 8 of the elements 4 any desired flexibility of the fastener may be afforded and by closely confining the tongues 8 the extent of bending may be restricted. This restriction is caused by the sides of the tongue 8 coming against the confining faces of the head 15 and side wing 13 in the one form of fastener element and against the confining faces of the two side wings 20 in the other form of fastener element, which limits the lateral tilting of the elements 4 to an extent determined by the proximity of the confining surfaces of the element 5. Freedom of bending may also be afforded by tapering or beveling the sides of the upper and lower ends of the head 11 or by oppositely beveling the inner faces of the wing 13 and the head 15 above and below the pin 14 (or the wings 20 in the structure of Fig. 6) if desired.

This construction affords a secure interlocking of the opposed elements of the fastener and at the same time permits any desired degree of flexibility, and the fastener is strong and durable and capable of withstanding continued and severe usage.

While I have shown and described my invention in a preferred form, I am aware that various changes and modifications may be made without departing from the principles of my invention the scope of which is to be determined by the appended claims.

I claim:

1. In a fastener of the class described, the combination of a series of fastener elements each having an extension at one side, a pin extending laterally from the extension and terminating in an abutment, another series of fastening elements movable in a plane substantially at right angles to the axis of the pin to interlock with the latter, and a member slidably engaging the two series of elements for interlocking and releasing same.

2. In a fastener of the class described, the combination of a series of fastener elements each having a flat tongue with seats in the opposite edges forming a neck with an elongated head, another series of fastener elements having cross bars substantially at right angles to the plane of the aforesaid flat tongue and adapted to engage in said seats and confine the neck portion of the first mentioned fastener elements therebetween, and a slider for interlocking and releasing said elements.

3. In a fastener of the class described, the combination of a series of fastener elements each having a flat extension with corresponding notches in the opposite edges, another series of fastener elements each having portions spaced laterally to embrace the flat extension of an element of the first mentioned series therebetween and having corresponding means extending between said laterally spaced portions for engaging in the notches of an element of the first mentioned series, and a slider for interlocking and releasing said elements.

4. In a fastener of the class described, the combination of a series of fastener elements each having a projecting tongue with notches in the opposite edges forming an elongated head, and said head having oppositely inclined end faces, another series of fastener elements having transversely extending stems adapted to be spread apart to receive the head of an element of the other series therebetween and to engage respectively in the aforesaid notches so as to interlock with the first mentioned element, and a member slidably engaging said elements for interlocking and releasing same.

5. In a fastener of the class described, the combination of a series of fastener elements each having an extension with a seat at each side thereof, another series of fastener elements each having a transversely extending stem adapted to engage in the seats of an element of the first series and confine the extension thereof therebetween, abutments at opposite ends of said stems for confining said extension therebetween against lateral displacement from the stems, and a slider for interlocking and releasing said elements.

6. In a fastener of the class described, the combination of separable parts, a series of fastener elements arranged in adjoining relation along the edge of one of said parts and each having a wing extension at one side with a laterally extending headed stem, a series of adjoining fastener elements on the other part, each having a central tongue notched in the opposite edges to form substantially a double hook and provided with oppositely inclined faces at the outer ends, and a slider operable along said series of fastener elements and adapted to spread the adjoining fastener elements of both series apart and to insert the double hooks of the fastener elements of one series between the headed stems of the other fastener elements and to insert the stems of the latter fastener elements between the central tongues of the other series.

7. In a fastening device of the class described the combination of opposed edges of material each having a series of fastener elements thereon, and a slider operable along the two series of elements for interlocking and releasing same, the elements of each series having mounting portions for securing the elements to the edges of the material and a head on each element connected with its respective mounting portion by a stem or neck, and said stems or necks of the elements of one series being interposed between the stems or necks of the elements of the other series in the interlocked position with the axes of the stems or necks of the elements of one series transverse to the axes of the stems or necks of the elements of the other series.

EMMETT A. SAUNDERS.